Jan. 3, 1967  F. GOLONKA  3,295,787
AUXILIARY FISH LINE SPOOL HOLDER
Filed Sept. 13, 1965
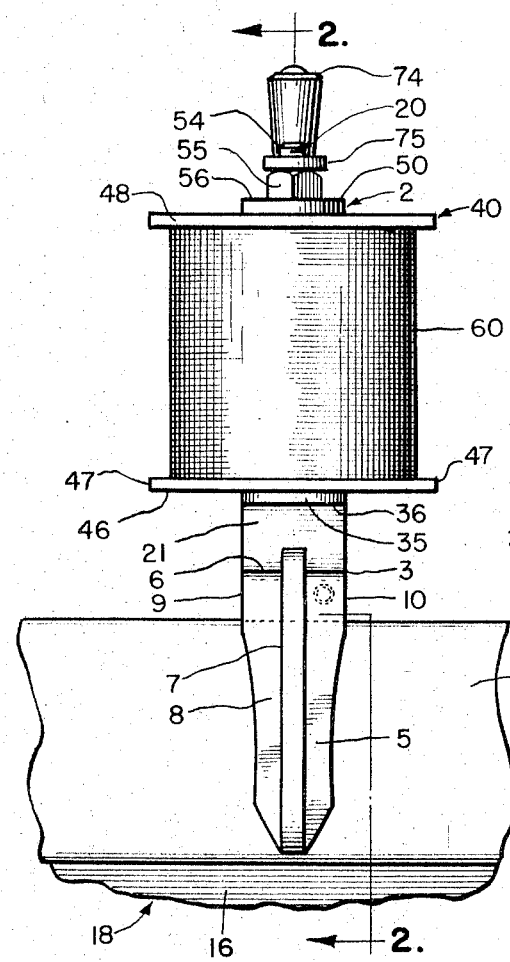
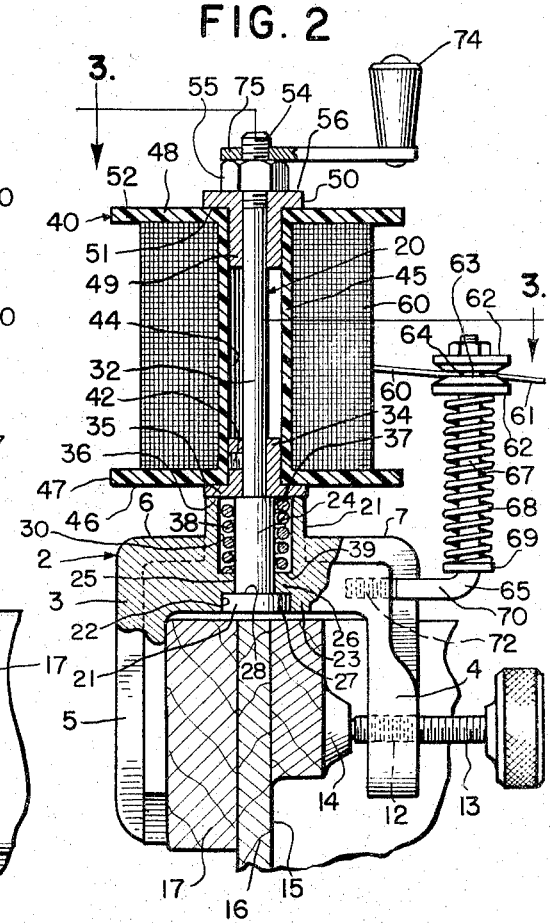
INVENTOR.
Fred Golonka
BY
John J. Kowalik
Attorney

United States Patent Office 3,295,787
Patented Jan. 3, 1967

3,295,787
AUXILIARY FISH LINE SPOOL HOLDER
Fred Golonka, 17 W. 645 Foster,
Wooddale, Ill. 60191
Filed Sept. 13, 1965, Ser. No. 486,989
10 Claims. (Cl. 242—129.8)

This invention relates to fishing equipment and more specifically to a novel holder for an auxiliary spool for additional lines or for changing the lines while the fisherman is in a boat.

Ordinarily the fisherman carries a tackle box with the necessary paraphernalia which includes several spools of fishing line. In order to add or change lines on the poles it is necessary to fumble around in the tackle box, then while holding the spool and the pole and the line attempt to make the changeover. In a tossing or crowded boat this becomes tedious and frequently ends up with the lines being tangled and snarled or the procedure is long drawn out.

A general object of the instant invention is to provide a novel, simple and efficient spool holder which is attachable in an accessible location to the gunwales of a boat.

The invention contemplates providing a novel holder for a spool upon which a line may be wound or unwound, said holder incorporating novel snubbing and latch means for maintaining tension on the line to prevent the reel from overrunning the discharge rate and thus fouling the line.

In one embodiment of the invention the reel snubbing and the line clamp means incorporate a common structure for adjusting the operation of the parts.

These and other objects and advantages inherent in and encompassed by the invention will become more readily apparent from the specifications and the drawings, wherein:

FIGURE 1 is a side elevational view of the novel holder shown mounted to a gunwale of a boat;

FIGURE 2 is a vertical cross section taken substantially on line 2—2 of FIGURE 1;

FIGURE 3 is a horizontal section taken substantially on line 3—3 of FIGURE 2; and FIGURE 4 is a fragmentary section similar to FIGURE 2 showing a modified embodiment.

Describing the invention in detail, the holder generally designated 2 comprises a lower mounting clamp or jaw 3 of inverted U-shape having a pair of laterally spaced depending inner and outer jaw portions 4 and 5 and an upper bight portion 6. These portions are reinforced by a center rib 7 on the exterior surface 8 of the jaw 3 substantially medially between the lateral edges 9 and 10 thereof.

One leg (preferably the inner portion 4) is transversely threaded at 12 and provided with a clamping screw 13 having a clamping foot 14 engaging the interior side 15 of the strake 16 of the gunwale 17 of the boat 18 (fragmentarily shown), and the outer portion or leg 5 of the clamp engages the outer side of the strake 16.

The bight portion 6 of the clamp provides a base for a spool-mounting spindle 20 disposed at its lower end within an enlarged upright sleeve 21 formed integral with portion 6 substantially medially between its ends and projecting upwardly therefrom. The spindle 20 has an enlarged cylindrical head 21 at its lower end complementally fitting into a bore 22 in the lower portion 23 of the bight 6, the head 21 is formed on the lower end of a cylindrical shank 24 which extends through an opening 25 in a wall 26 defining the upper limit of bore 22, the wall 26 providing a friction surface 27 on its underside for engagement by the flat upper surface 28 of the bolt head.

The shank 24 projects through the close fitting opening 25 in the wall 26 and extends into a bore 30 in the sleeve 21. The stem or shank 24 has an extensive length 32 of reduced section above the sleeve 21 and admits a lower spool mounting sleeve or bearing 34 thereon, said sleeve 34 having an outturned radial flange 35 along its lower edge topping the upper edge 36 of the sleeve 21 and providing on its underside a seat 37 for the upper end of a compression spring 38 which is sleeved over the lower end of stem 24 and fits in bore 30 and seats at its lower end upon the top side 39 of wall 26. Thus the rotation of the spindle and the spool 40 mounted thereon is snubbed or frictionally resisted inasmuch as the spring 38 is held under compression between the sleeve 34 and the wall 26 and the compression of the spring being determined by the position of sleeve 34 which has a set screw 42 threaded therethrough and engaging shank portion 32 of the spindle in any of a plurality of axially spaced positions on the shank portion 32.

The cylindrical portion 34 (it being understood that the cross section of which may be of any form) conforms to and fits into the lower end of the opening 44 in the core 45 of spool 40 while the flange 35 has its upper side abutting against the external side 46 of the lower flange 47 of spool 40.

The core 45 joins at its upper end a flange 48 of the spool 40 and the upper end of the core 45 admits a sleeve 49 in bore 44, sleeve 49 having a radial flange 50 which has its lower side 51 engaging the outer side 52 of the flange 48.

The stem 32 is threaded at its upper end as at 54 above the sleeve 49 and there is a nut 55 threaded thereon engaging the top side 56 of flange 50 and tightening the spindle to the spool which in the present instance is shown as having a line 60 wound thereon the free end 61 of which is held between a pair of opposed grasps in the nature of a pair of frusto-conical washers 62, 62 defining a divergent notch 63 for guiding the strand portion 61 to and from the opposing flats 64.

The grasps are sleeved on the upper end of one leg of a U-shaped support rod 65 having a nut 66 threaded on the upper end of the upright portion 67 thereof, said portion 67 having a compression spring 68 sleeved thereon, the spring bearing at its upper end against the lower element 62 and at its lower end seating upon a washer seat 69 sleeved on the portion 67 and reacting against an angular, generally horizontal, mounting on leg portion 70 which is threaded as at 72 into the inboard leg 4 of the base clamp.

For winding line onto the spool a crank 74 has an arm 75 threaded onto the upper end of the stem whereby the spool may be rotated in a direction to wind the line or thread thereon.

The embodiment of FIGURE 4 is essentially identical with that of FIGURES 1–3 except that it eliminates the spring 38 and in lieu thereof substitutes a slug 80 of plastic material such as nylon which extends through a bore or drilling 81 in the leg 4 of the base clamp into the bore 30 said slug being compressed against the lower portion of the spindle 32 by the leg 70 which is adapted to be threaded at 72 into and out of the bore 81. The slug 80 thus not only controls the snubbing of the spindle but also serves to hold the grasping mechanism against free tilting or unscrewing. To increase the snubbing effect the lower end portion 70 of the support rod 65 is threaded into the bore 81 and to reduce the snubbing said portion 70 is unthreaded.

Having described several embodiments of the invention it will be apparent that other forms will now become readily apparent to those skilled in the art within the scope of the appended claims.

I claim:

1. An auxiliary spool holder having a support including a base clamp adapted for attachment to an associated support structure, a spindle rotatably mounted in said support and having a shank portion projecting therefrom, adjustable means interposed between the shank and support for frictionally resisting rotation of the spindle, a spool mounted on said spindle for rotation therewith, and a line grasp means mounted on said clamp adjacent to the spool and comprising a holder disposed generally parallel with the spindle and having a pair of jaws with conical opposing faces diverging toward the spindle and separable axially of the spool for releasably holding a line wound upon the spool.

2. An auxiliary spool holder having a support including a base clamp adapted for attachment to an associated support structure, a spindle rotatably mounted in said support and having a shank portion projecting therefrom, adjustable means interposed between the shank and support for frictionally resisting rotation of the spindle, a spool mounted on said spindle for rotation therewith, and said adjustable means comprising transaxial friction surfaces on the spindle and on the clamp support in rotatable engagement, and means including spring means interposed between the support and said spindle biasing said spindle axially into engaged position of the spindle, and a spool holder on the spindle serving as a reaction element for the spring and adjustable axially of the spindle for varying the reaction of the spring means.

3. An auxiliary spool holder having a support including a base clamp adapted for attachment to an associated support structure, a spindle rotatably mounted in said support and having a shank portion projecting therefrom, adjustable means interposed between the shank and support for frictionally resisting rotation of the spindle, a spool mounted on said spindle for rotation therewith, and a line grasp means mounted on said clamp adjacent to the spool for releasably holding a line wound upon the spool, and said adjustable means comprising a mount for said grasp means including a bore in the support extending to said spindle, and an element threaded into said bore, and a compressible material slug within the bore compressed between the element and spindle and releasably holding element from unthreading and snubbing the rotation of the spindle.

4. An auxiliary spool holder having a support including a base clamp adapted for attachment to an associated support structure, a spindle rotatably mounted in said support and having a shank portion projecting therefrom, adjustable means interposed between the shank and support for frictionally resisting rotation of the spindle, a spool mounted on said spindle for rotation therewith, and a line grasp means mounted on said clamp adjacent to the spool for releasably holding a line wound upon the spool, and said line grasp means comprising an L-shaped element, a threaded bore in the support having threaded engagement with one leg of said element, said support having a bore mounting, said spindle intersecting said first-mentioned bore, and a nylon insert within the first-mentioned bore compressed between the one leg of the spindle, and a pair of spring-loaded grasps on the other leg alongside the spool.

5. In an auxiliary spool holder, a base support including clamp means for attachment to a boat and the like, a spindle having one end rotatably mounted in a bore in said support, adjustable means between said spindle and support and comprising a nylon insert compressed into tight frictional engagement with the spindle to resist rotation of the spindle, and means on the spindle for releasably mounting a spool thereon.

6. In an auxiliary spool holder, a base support including clamp means for attachment to a boat and the like, a spindle having one end rotatably mounted in a bore in said support, adjustable means within the bore biasing the spindle and support into tight frictional engagement with each other to resist rotation of the spindle, and means on the spindle for releasably mounting a spool thereon, and a line grasp positioned adjacent said spindle and including an element having a portion threaded into a threaded bore in intersecting said first-mentioned bore, and said adjustable means comprising a slug of nylon within said second bore and extending into the first-mentioned bore and compresed between said element and said spindle and additionally serving to resist withdrawal of the spindle and loosening of said line grasp.

7. The invention according to claim 6 and said line grasp including a pair of frusto-conical members on said element defining a grasping nip therebetween for receiving said line therein.

8. The invention according to claim 7 and said spindle having a free end and a crank secured to said free end of the spindle.

9. The invention according to claim 8 and said element being L-shaped and having a leg generally paralleling said spindle and said nip between said members extending transaxially of said spindle.

10. The invention acording to claim 9 and said element having another of its legs threaded into said second-mentioned bore and said nylon slug having a portion deformed about said spindle.

References Cited by the Examiner
UNITED STATES PATENTS

| | | | |
|---|---|---|---|
| 2,734,694 | 2/1956 | Davidson | 242—106 |
| 3,148,844 | 9/1964 | Kabat | 242—106 |

FRANK J. COHEN, *Primary Examiner.*

L. D. CHRISTIAN, *Assistant Examiner.*